(12) United States Patent
Shao et al.

(10) Patent No.: US 9,395,591 B2
(45) Date of Patent: Jul. 19, 2016

(54) PIXEL UNIT, ARRAY SUBSTRATE AND LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Xibin Shao, Beijing (CN); Honglin Zhang, Beijing (CN); Hebin Zhao, Beijing (CN); Dan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 13/947,672

(22) Filed: Jul. 22, 2013

(65) Prior Publication Data

US 2014/0070260 A1    Mar. 13, 2014

(30) Foreign Application Priority Data

Sep. 13, 2012  (CN) .......................... 2012 1 0339738

(51) Int. Cl.
*G02F 1/1362* (2006.01)
*G02F 1/1343* (2006.01)

(52) U.S. Cl.
CPC .... *G02F 1/136286* (2013.01); *G02F 1/134363* (2013.01); *G02F 2001/134318* (2013.01); *G02F 2001/134345* (2013.01)

(58) Field of Classification Search
CPC ... H01L 27/124; H01L 27/1214; H01L 27/12; H01L 29/66757; H01L 29/78621; H01L 33/62; G02F 1/134363; G02F 1/136286; G02F 2001/134318; G02F 2001/134345
USPC .................................. 257/E27.132, E27.131
See application file for complete search history.

(56) References Cited

U.S. PATENT DOCUMENTS 8,704,231 B2 *   4/2014   Sun et al. ......................... 257/59
2001/0005252 A1 *  6/2001   Lee et al. ...................... 349/141

(Continued)

FOREIGN PATENT DOCUMENTS

CN          1598652 A      3/2005
CN         102253553 A    11/2011

(Continued)

OTHER PUBLICATIONS

First Chinese Office Action dated Jul. 28, 2014; Appln. No. 201210339738.1.

(Continued)

*Primary Examiner* — Latanya N Crawford
(74) *Attorney, Agent, or Firm* — Ladas & Parry LLP

(57) ABSTRACT

According to embodiments the invention, there are provided a pixel unit, an array substrate and a liquid crystal display device. The pixel unit comprises: a first electrode, an insulating layer located on the first electrode, and a second electrode located on the insulating layer. The first electrode includes a plurality of first electrode strips which are parallel to each other and are spaced at an interval, the second electrode includes a plurality of second electrode strips which are parallel to each other and are spaced at an interval; and an angle between the first electrode strips and the second electrode strips located above the first electrode strips is larger than 0 degree and smaller than or equal to 90 degrees.

10 Claims, 4 Drawing Sheets

(56) References Cited

U.S. PATENT DOCUMENTS

| | | | |
|---|---|---|---|
| 2002/0067453 A1* | 6/2002 | Kim et al. | 349/141 |
| 2004/0080699 A1* | 4/2004 | Lee | 349/141 |
| 2004/0095543 A1* | 5/2004 | Ko et al. | 349/141 |
| 2004/0239860 A1* | 12/2004 | Lee | 349/141 |
| 2004/0263748 A1* | 12/2004 | Park et al. | 349/141 |
| 2005/0083467 A1 | 4/2005 | Lee et al. | |
| 2005/0093805 A1* | 5/2005 | Hong et al. | 345/94 |
| 2005/0094078 A1* | 5/2005 | Kang | 349/141 |
| 2005/0117102 A1* | 6/2005 | Park et al. | 349/141 |
| 2005/0206824 A1* | 9/2005 | Son et al. | 349/141 |
| 2006/0055862 A1 | 3/2006 | Choi | |
| 2008/0002122 A1* | 1/2008 | Song | G02F 1/134363 349/139 |
| 2009/0310046 A1* | 12/2009 | Su | 349/33 |
| 2011/0304787 A1* | 12/2011 | Wang et al. | 349/33 |
| 2012/0161142 A1* | 6/2012 | Sun et al. | 257/59 |
| 2013/0033665 A1 | 2/2013 | Chung et al. | |
| 2013/0329168 A1 | 12/2013 | Chung et al. | |

FOREIGN PATENT DOCUMENTS

| | | |
|---|---|---|
| CN | 102692770 A | 9/2012 |
| CN | 202794784 U | 3/2013 |
| KR | 1020020041426 A | 6/2002 |
| KR | 20050034953 A | 4/2005 |
| KR | 1020050068209 A | 7/2005 |
| KR | 20080100997 A | 11/2008 |
| KR | 20120055123 A | 5/2012 |

OTHER PUBLICATIONS

Korean Office Action dated Jun. 27, 2014; Appln. No. 10-2013-0085415.

Second Chinese Office Action Appln. No. 201210339738.1; Dated Dec. 29, 2014.

Korean Examination Opinion Appln. No. 10-2013-0085415; Dated Feb. 27, 2015.

Korean Office Action—Notice of Rejection Decision dated Apr. 29, 2015; Appln. No. 10-2013-0085415.

Extended European Search Report Appln. No. 13170290.4-1904/2708940; Dated Mar. 23, 2015.

European Patent Office Office Action Appln. No. 13 170 290.4-1904; Dated Mar. 2, 2016.

* cited by examiner

PIXEL UNIT, ARRAY SUBSTRATE AND LIQUID CRYSTAL DISPLAY DEVICE

TECHNICAL FIELD

Embodiments of the present invention relate to a pixel unit, an array substrate and a liquid crystal display device.

BACKGROUND

Liquid crystal display (LCD) devices have become the most important type of flat panel display devices at present. The display of a liquid crystal display device is based on pixels (or sub-pixels). A pixel electrode and a common electrode are included in each pixel, and an electric field can be generated between these two electrodes to drive liquid crystals corresponding to the pixel to be twisted. Thus, the amount of light transmitted through the pixel is changed, so that required content is displayed on the liquid crystal display device as a whole.

Advanced super dimension switch (ADS) mode liquid crystal display devices belong to a kind of liquid crystal display device, in which, a multi-dimensional electric field is formed by an electric field produced at edges of slit electrodes on a same plane and an electric field produced between the layer of the slit electrodes and the layer of a plate-like electrode, so as to allow liquid crystal molecules at all orientation within a liquid crystal cell, which are located directly above the electrode and between the slit electrodes, to be rotated, and thereby work efficiency of liquid crystals can be enhanced and transmissive efficiency is increased. The advanced super dimension switch technology can improve the picture quality of TFT-LCD (Thin Film Transistor-Liquid Crystal Display) products, and has advantages such as high resolution, high transmittance, low power consumption, wide viewing angles, high aperture ratio, low chromatic aberration, push Mura-free, etc.

FIG. 1 is a top view showing one pixel unit of an array substrate of an existing ADS mode liquid crystal display device. FIG. 2 is a schematic view showing a cross-section of the one pixel unit of the array substrate of the existing ADS mode liquid crystal display device taken along line A-A'.

As shown in FIG. 2, a common electrode 2 in the shape of a plate is located on an array substrate 9, the common electrode 2 is covered by an insulating layer 7 (for example a silicon dioxide layer), and on the insulating layer 7 there is provided a pixel electrode 1. The pixel electrode 1 includes a plurality of pixel electrode strips 11 which are spaced at an interval. When voltage difference is applied across the pixel electrode 1 and the common electrode 2, a multi-dimensional electric field that can acts to drive liquid crystals to rotate can be generated between the pixel electrode strips 11 and the common electrode 2.

As shown in FIG. 1, in order to reduce color deviation, the pixel electrode strips 11 of the pixel electrode 1 in one pixel unit which has the profile of one rectangle can be divided into two groups as a whole, which groups are respectively located in the upper part and in the lower part as shown in FIG. 1. The pixel electrode strips 11 in each group are parallel to each other, while the extension lines of the two groups of the pixel electrode strips 11 cross each other at a certain angle, which design is also referred to as "a tapered electrode". Certainly, in a complete pixel unit, a thin film transistor and other structures should also be included, and they will not be described here for the purpose of simplicity.

In the ADS mode liquid crystal display device, because the common electrode 2 and the pixel electrode 1 are apart from each other at a short distance and have a large opposing area therebetween, the pixel unit has overlarge storage capacitance (Cst). Storage capacitance is a feature necessary for performing liquid crystal display, and is useful for maintaining the electric field in the pixel unit when a voltage is not applied to the pixel electrode, so that display pictures can become stable. However, if storage capacitance is overlarge, then on one hand, it will lead to slow charging of a storage capacitor, thereby resulting in a display error along the line of A gate line (H-block, horizontal block), and on the other hand, it will lead to slow discharging of the storage capacitor, and afterimage phenomenon occurs (Line-IS, line afterimage). When the display device has a relatively high refresh frequency, these issues become more serious. Generally, as to some certain picture for detection, overlarge storage capacitance is manifested with pictures of being greenish.

The pixel units of the existing advanced super dimension switch mode liquid crystal display devices suffer from such problems that the storage capacitance is overlarge or unstable, and the requirement on production precision is high.

SUMMARY

In an aspect of the invention, there is provided a pixel unit, comprising: a first electrode, an insulating layer located on the first electrode, and a second electrode located on the insulating layer; the first electrode includes a plurality of first electrode strips which are parallel to each other and are spaced at an interval, the second electrode includes a plurality of second electrode strips which are parallel to each other and are spaced at an interval, and the angle between the first electrode strips and the second electrode strips located above the first electrode strips is larger than 0 degree and smaller than or equal to 90 degrees.

As to the pixel unit, for example, the angle between the first electrode strips and the second electrode strips located above the first electrode strips is larger than 10 degrees and smaller than or equal to 90 degrees.

As to the pixel unit, for example, the first electrode is a common electrode, and the second electrode is a pixel electrode.

For example, widths of all the first electrode strips are equal.

For example, intervals between adjacent first electrode strips among the first electrode strips are equal.

As to the pixel unit, for example, among the first electrode strips, a sum of a width of one first electrode strip and an interval of the one first electrode to an adjacent first electrode strip ranges between 5 μm and 7 μm.

As to the pixel unit, for example, the first electrode is a pixel electrode, and the second electrode is a common electrode.

For example, widths of all the second electrode strips are equal.

For example, intervals between adjacent second electrode strips among the second electrode strips are equal.

As to the pixel unit, for example, among the second electrode strips, a sum of a width of one second electrode strip and an interval of the one second electrode to an adjacent second electrode strip ranges between 5 μm and 10 μm.

As to the pixel unit, for example, the plurality of first electrode strips are divided into two groups, which are located on two sides of a central line of the pixel unit, respectively, and are symmetric to each other.

As to the pixel unit, for example, the plurality of second electrode strips are divided into two groups, which are located on two sides of a central line of the pixel unit, respectively, and are symmetric to each other.

In another aspect of the invention, there is provided an array substrate, comprising any one of the above-mentioned pixel unit.

In still another aspect of the invention, there is provided a liquid crystal display device, comprising the above array substrate.

In view of the above array substrate, as the liquid crystal display device includes the above array substrate, storage capacitance is low and stable, and the requirement on production precision is not high.

REFERENCE NUMERALS

1: pixel electrode; 11: pixel electrode strip; 2: common electrode;
21: common electrode strip; 7: insulating layer; 9: array substrate.

DETAILED DESCRIPTION

In order to make the technical solutions of the present invention be understood better by those skilled in the art, hereinafter, the invention will be described in detail in combination with accompanied drawings and specific embodiments.

Unless otherwise defined, the technical or scientific terminology used herein should have the same meaning as commonly understood by one of ordinary skill in the art to which this invention belongs. "First", "second" and the like used in specification and claims of the patent application of the invention do not show any order, number or importance, but are only used to distinguish different constituent parts. Likewise, the wording such as "a," "an," "the" or the like does not indicate limitation in number, but specifies the presence of at least one. The term such as "comprises," "comprising," "includes," "including", "contains" or the like means that an element or article ahead of this term encompasses element(s) or article(s) listed behind this term and its (their) equivalents, but does not preclude the presence of other elements or articles. The term such as "connection," "connected," or the like is not limited to physical or mechanical connection, but can include electrical connection, whether directly or indirectly. "Upper," "lower," "left," "right" or the like is only used to describe a relative positional relationship, and when an absolute position of the described object is changed, the relative positional relationship might also be changed accordingly.

Figure 3:
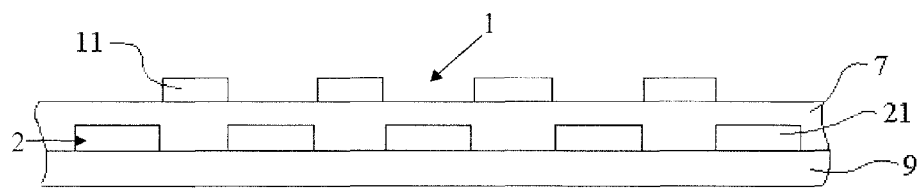
FIG. 3 is a schematically cross-sectional view showing the structure of a pixel unit.

FIG. 3 is a schematically cross-sectional view showing a pixel unit of an array substrate of an ADS mode liquid crystal display device.

As shown in FIG. 3, for solving the problem that the storage capacitance is overlarge, in the pixel unit of the ADS mode liquid crystal display device shown in FIG. 3, the common electrode 2 also comprises a plurality of common electrode strips 21 which are spaced at an interval. The common electrode strips 21 are parallel to the corresponding pixel electrode strips 11 (in other words, the pixel electrode strips 11 located above them), and distributed immediately at the gaps of the pixel electrode strips 11. With this design, storage capacitance is reduced because the opposing area of the pixel electrode 1 and the common electrode 2 is reduced. However, this kind of pixel unit places a very high demand on the production precision (which mainly refers to an alignment precision during photolithography) when it is manufactured. If there is slight deviation in the relative position between the pixel electrode 1 and the common electrode 2, then the electric field distribution and the opposing area between the pixel electrode 1 and the common electrode 2 may be changed remarkably. Thus, this brings about such problem that the storage capacitance is unstable, the electric field distribution is non-uniform, and so on.

An array substrate according to an embodiment of the invention includes a plurality of gate lines and a plurality of data lines, and these gate lines and data lines cross over each other to define pixel units arranged in a matrix form, each of which includes a thin film transistor functioning as a switch element and a pixel electrode and a common electrode which are used to control arrangement of liquid crystals. For example, for the thin film transistor of each pixel, its gate electrode is electrically connected to or integrally formed with a corresponding gate line, its source electrode is electrically connected to or integrally formed with a corresponding data line, and its drain electrode is electrically connected to or integrally formed with a corresponding pixel electrode. The following description will be made on a single pixel unit or a plurality of pixel units, but other pixel unit(s) can be formed in the same way. In an array substrate according to an embodiment of the invention, a common electrode line may be further included, and common electrodes in pixel units may be connected to the common electrode line.

Embodiment 1

The embodiment provides a pixel unit of an array substrate, comprising: a first electrode, an insulating layer located on the first electrode, and a second electrode located on the insulating layer. For example, the insulating layer covers the first electrode. The first electrode and the second electrode are electrically insulated from each other by the insulating layer. The first electrode includes at least one set of first electrode strips (a plurality of first electrode strips) which are parallel to each other and are spaced at an interval, the second electrode includes at least one set of second electrode strips (a plurality of second electrode strips) which are parallel to each other and are spaced at an interval, and the angle between the first electrode strips and the second electrode strips located above the first electrode strips is larger than 0 degree and smaller than or equal to 90 degrees.

Because the first electrode strips and the second electrode strips are located on different layers, the angle between the first electrode strips and the second electrode strips is, for example, the angle between the vertical projection of the first electrode strips on the second electrode strips and the second electrode strips.

Figure 8:
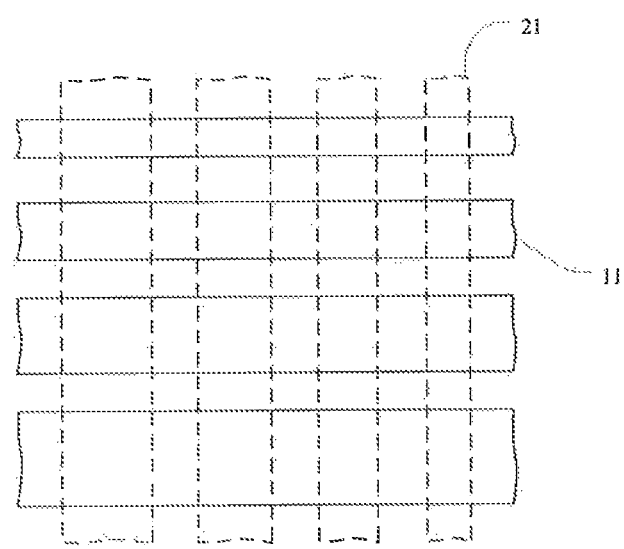
FIG. 8 is a schematically top view showing a partial structure of a pixel unit according to an embodiment of the invention.

The plurality of first electrode strips may have an equal width, or have different widths, for example, the widths of the first electrode strips are gradually increased based on a certain rule (e.g., as illustrated in FIG. 8); and the interval between every two adjacent first electrode strips may be equal or unequal. The plurality of second electrode strips may have an equal width, or have different widths, for example, the widths of the second electrode strips are gradually increased based on a certain rule (e.g., as illustrated in FIG. 8); and the interval between every two adjacent second electrode strips may be equal or unequal.

Certainly, in a complete pixel unit, a thin film transistor and other structures should also be included, and they will not be described in detail for simplicity.

In the pixel unit according to the embodiment, because the common electrode and the pixel electrode each take the form of "electrode strips", the opposing area between the common electrode and the pixel electrode is relatively small. Thus, storage capacitance of the pixel unit is also relatively small, and thereby, drawbacks such as H-block, Line-IS, Greenish, etc. can be avoided. Furthermore, there is an angle between the common electrode strips and the pixel electrode strips (in other words, they are slanted toward each other), so when the production precision is relatively low, relationship between the common electrode strip and the pixel electrode strip has only a relative position shift, but the total opposing area, the electric field distribution and so on between the electrodes will not change substantially. Therefore, as to this kind of pixel unit, the storage capacitance is stable, and the electric field distribution is uniform.

Embodiment 2

Figure 4:
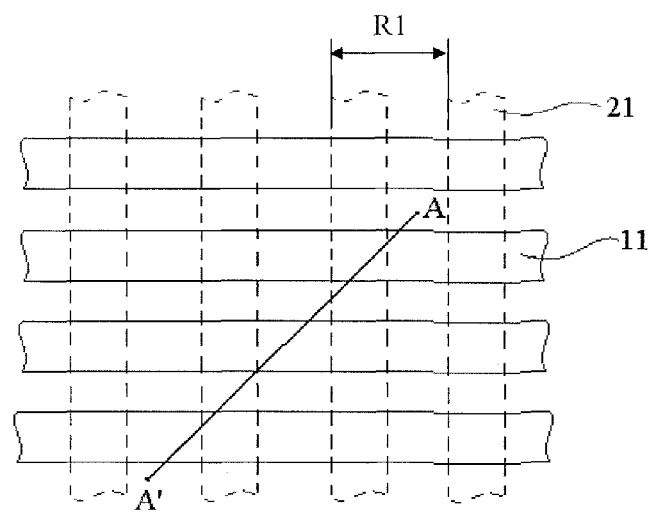
FIG. 4 is a schematically top view showing a partial structure of a pixel unit according to Embodiment 2 of the invention.
Figure 5:
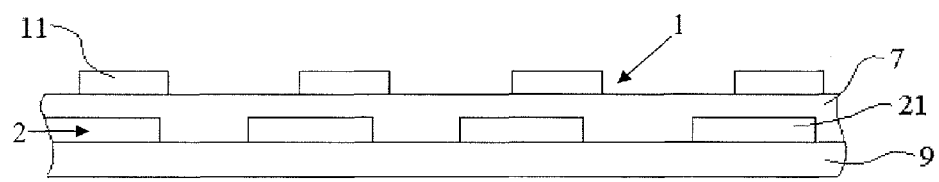
FIG. 5 is a structurally schematic view showing a cross-section of the pixel unit in FIG. 4 along the line of A-A'.

FIG. 4 is a schematically top view showing a partial structure of a pixel unit of an array substrate according to Embodiment 2 of the invention; and FIG. 5 is a structurally schematic view showing a cross-section of the pixel unit in FIG. 4 taken along the line of A-A'. As shown in FIG. 4 to FIG. 5, the embodiment provides a pixel unit of an array substrate, which comprises a common electrode 2, an insulating layer 7 and a pixel electrode 1.

In this embodiment, the common electrode 2 as an example of the first electrode is located on an array substrate 9, and can be made from a transparent conductive material such as indium tin oxide (ITO), etc. For example, it may be connected to a common electrode line (not shown in the drawing) and acts to apply a common voltage (Vcom) to the pixel unit when the liquid crystal display is in operation. For example, the substrate 9 includes an array layer, in which, a thin film transistor, a gate line, a data line and other structures are formed, and a common electrode line may further be formed therein. The thin film transistor, the gate line, the data line, the common electrode line and so on may employ known connection manner and driving manner, and the present invention is not limited thereto.

The insulating layer 7 is formed on the common electrode 2, can be made from an insulating material such as silicon dioxide, etc., and acts to separate the common electrode 2 from the pixel electrode 1. For example, the insulating layer 7 covers the common electrode 2.

The pixel electrode 1 as an example of the second electrode is located on the insulating layer 7, and can be made from a transparent conductive material such as indium tin oxide (ITO), etc. For example, the pixel electrode 1 is connected to the drain electrode of the thin film transistor (not shown in the drawing) of the pixel unit, while the source electrode and the gate electrode of the thin film transistor are connected to a data line and a gate line, respectively. Upon display, a voltage signal for generating grayscale in the pixel unit is applied to the pixel electrode 1 through the thin film transistor, so that an electric field is generated between the common electrode 2 and the pixel electrode 1 and a liquid crystal material is driven by the electrode field.

As shown in FIG. 4 and FIG. 5, the common electrode 2 comprises at least one set of common electrode strips 21 (i.e., the first electrode strips, and broken-lines indicate that the common electrode strips 21 are located below the insulating layer 7), and the plurality of common electrode strips 21 in each set are parallel to each other and are spaced at an interval. The pixel electrode 2 then comprises at least one set of pixel electrode strips 11 (i.e., the second electrode strips), and the plurality of common electrode strips 11 in each set are parallel to each other and are spaced at an interval. The angle between the common electrode strips 21 and the pixel electrode strips 11 located above the common electrode strips 21 is larger than 0 degree and smaller than or equal to 90 degrees.

Figure 6:
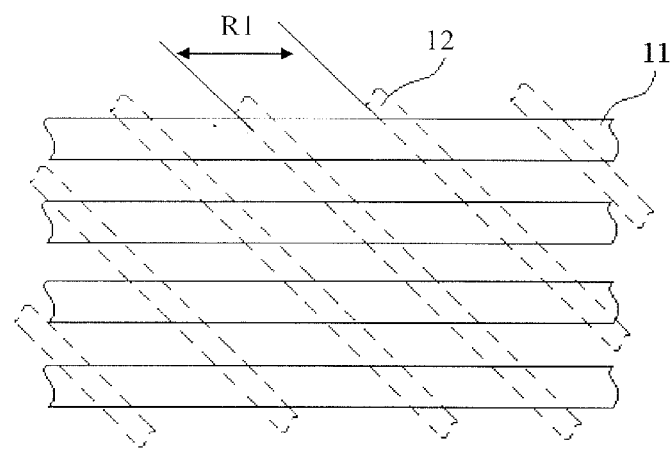
FIG. 6 is schematically top view showing a partial structure of another pixel unit according to Embodiment 2 of the invention.

FIG. 6 is a schematically top view showing a partial structure of another pixel unit according to Embodiment 2 of the invention, and a cross-section of the pixel unit is similar to that shown in FIG. 5.

FIG. 4 and FIG. 6 show such examples in which the angle between the common electrode strips 21 and the pixel electrode strips 11 is equal to 90 degrees and 45 degrees, respectively; but it should be understood that, the angle may also be equal to 10 degrees, 15 degrees, 30 degrees, 45 degrees, 60 degrees, 90 degrees or any other suitable degrees.

Likewise, because the first electrode strips 21 and the second electrode strips 11 are located on different layers, the angle between the first electrode strips 21 and the second electrode strips 11 is, for example, the angle between the vertical projection of the first electrode strips 21 on the second electrode strips 11 and the second electrode strips 21. The plurality of first electrode strips 21 may have the same width, or have different widths, such as, the widths that are increased gradually based on a certain rule; and the interval between every two adjacent first electrode strips 21 may be equal or unequal. The plurality of second electrode strips 11 may have the same width, or have different widths, such as, widths that are increased gradually based on a certain rule; and the interval between every two adjacent second electrode strips 11 may be equal or unequal.

Each of the width of an electrode strip and the distance between adjacent electrode strips is a value measured in the direction perpendicular to the length direction of the electrode strips.

Figure 1:
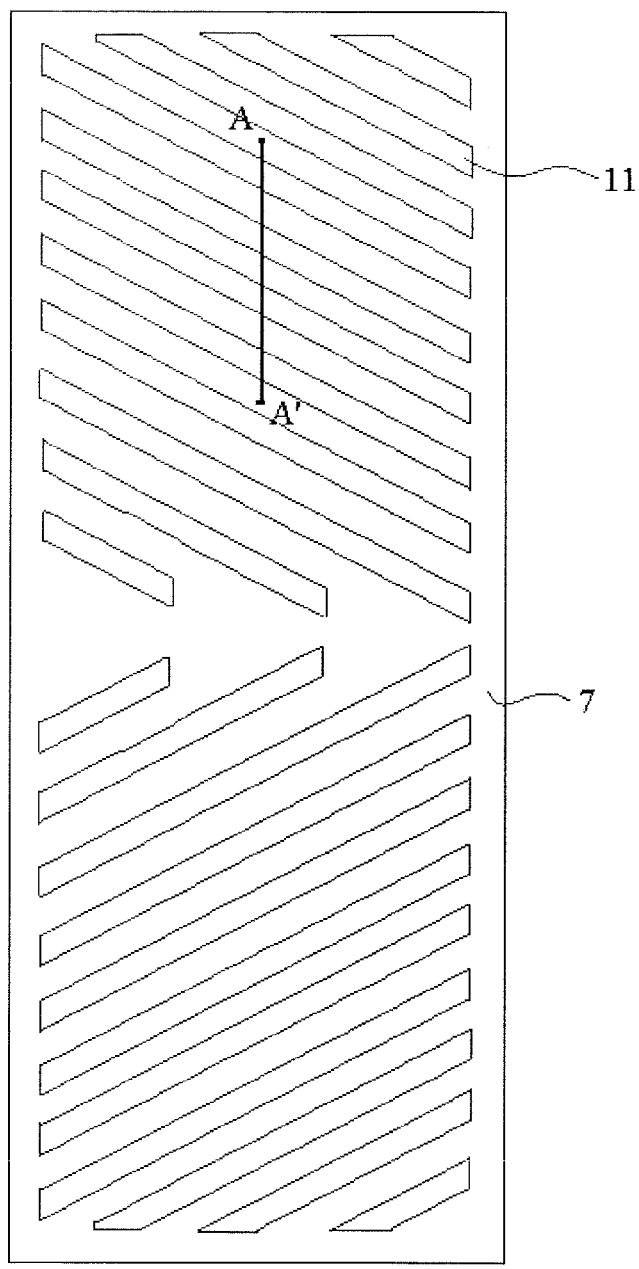
FIG. 1 is a schematically top view showing the structure of an existing pixel unit.
Figure 2:
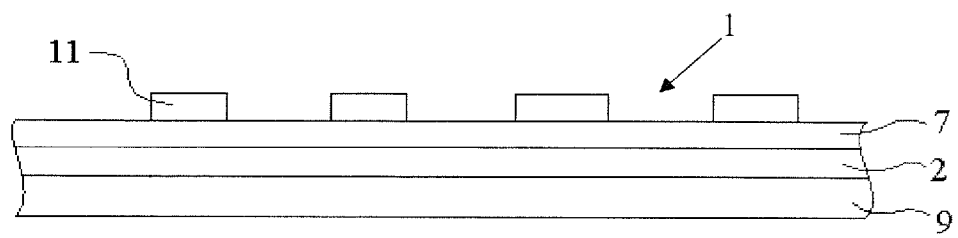
FIG. 2 is a structurally schematic view showing a cross-section of the pixel unit in FIG. 1 along the line of A-A'.

Certainly, the electrodes in the pixel unit according to the embodiment may be in the form which is similar to "the tapered electrode" as shown in FIG. 1; that is, the pixel electrode 1 may comprise two sets of pixel electrode strips 11, and the extension lines of the two sets of pixel electrode strips 11 cross each other at a certain angle; correspondingly, the common electrode 2 comprises two sets of common electrode strips 11, and each set of common electrode strips 21 make a certain angle with the pixel electrode strips 11 located over them. The two sets of pixel electrode strips 11 are distributed for example on two sides of the central line of the pixel unit so as to be symmetric to each other; likewise, the two sets of common electrode strips 21 are distributed for example on two sides of the central line of the pixel unit so as to be symmetric to each other.

Because the common electrode and the pixel electrode each take the form of "electrode strips", the opposing area between the two is relatively low, and in turn, storage capacitance produced between the electrodes is also relatively small. Furthermore, as shown in FIG. 5, the common electrode strips 21 are not parallel to the pixel electrode strips 11 located over them, and therefore, even if change in relative position happens to the common electrode strips 21 and the pixel electrode strips 11 due to insufficient production precision, the total opposing area, the electric field distribution and so on between the two electrodes will not change substantially. Therefore, as to the pixel unit according to the embodiment, the storage capacitance is stable, the electric field distribution is uniform, and the requirement on production precision is not high.

For example, the angle between the common electrode strips 21 and the pixel electrode strips 11 located over the common electrodes 21 is larger than or equal to 10 degrees and smaller than or equal to 90 degrees, and further, for example, the angle is in the range of 30 degrees to 60 degrees. When the above-mentioned angle is too small, the relationship between the pixel electrode strip 11 and the common electrode strip 21 still quite approximates a parallel state, and advantages of the pixel unit according to the embodiment are not obvious. After analysis, it is found that, when the angle is larger than or equal to 10 degrees, the merits of the pixel unit according to the embodiment can become more noticeable.

For example, the width of each of the common electrode strips 21 is equal, and interval between adjacent common electrode strips 21 of the common electrode strips is equal. That is, the common electrode strips 21 are periodically distributed with regularity, and this is helpful to ensure the uniform distribution of electric fields within the pixel unit. For example, in this case, the width of each of the pixel electrode strips 11 may also be equal, and the interval between adjacent pixel electrode strips 11 of the pixel electrode strips 11 may also be equal, so that the pixel electrode strips 21 are periodically distributed with regularity.

Preferably, in the same set, the sum R1 (as shown in FIGS. 4 and 6) of the width of one common electrode strip 21 and the distance from between two adjacent common electrode strip 21 ranges between 5 μm and 7 μm. That is, the value of the sum of the strip width and the interval between the common electrode strips 21 is preferably in the range of 5 μm to 7 μm.

As shown in the following table 1 to table 3, when the common electrode strips 21 and the pixel electrode strips 11 are disposed to be slanted toward each other, the impact of a specific tilt angle (an intersecting angle) on the storage capacitance is smaller than the impact of the value of the strip width plus the interval between the common electrode strips 21 on the storage capacitance; with a simulation test, it is found that, with the value of the sum of a strip width and an interval between the common electrode strips 21 within the above range, on one hand, a relatively suitable value of storage capacitance can be guaranteed, and moreover, it also can be ensured that the electric field distribution in the pixel unit does not have too great difference with that in an existing advanced super dimension switch mode liquid crystal display device, so that display will not be affected. In the event that the value of the sum of a strip width and an interval between the common electrode strips 21 is determined, specific values of strip width and interval can be adjusted by those skilled in the art according to requirements. For example, the strip width of the common electrode strips 21 are usually in the range of 2 μm to 5 μm, and interval is in the range of 2 μm to 5 μm.

Of course, change in the form of the common electrode strips 21 will make certain impact on the electric field distribution in the pixel unit, and therefore after certain electrode parameters (for example, strip width, interval, intersecting angle, etc.) are selected, what display effect can be achieved by them can be confirmed, for example, by means of simulation computation.

It is preferable that the value of the sum of a strip width and an interval between the common electrode strips 21 is defined, but the value of the sum of a strip width and an interval between the pixel electrode strips 11 is not defined. The reason is that, the voltage applied to the common electrode is relatively constant, while the voltage applied to the pixel electrode varies within a relatively large range. Thus, parameters of the pixel electrode strips 11 are not changed preferably. Generally, in the same set, the widths of the pixel electrode strips 11 may be selected to be in the range of 2 μm to 8 μm as desired, and interval is in the range of 2 μm to 8 μm.

Table 1 to table 3 illustrate properties of the pixel units which are obtained by simulation computations when the value of the sum of a strip width and an interval between adjacent common electrode strips 21 in the same set are 5 μm, 6 μm and 7 μm, respectively. Here, for the sake of convenient comparison, the widths of pixel electrode strips 11 in the same set are uniformed to be 2.6 μm, and the interval is 5.4 μm. "Reduction in storage capacitance" refers to a ratio by which the storage capacitance of the pixel unit according to the embodiment is reduced relative to the storage capacitance of an existing pixel unit, namely, "reduction in storage capacitance=(the storage capacitance of the existing pixel unit–the storage capacitance of the pixel unit according to the invention)/the storage capacitance of the existing pixel unit. The existing pixel unit for comparison is the pixel unit which adopts the plate-like common electrode shown in FIG. 1, and the widths of pixel electrode strips 11 in the pixel electrode are uniformed to be 2.6 μm, and the interval is 5.4 μm. In the existing pixel unit shown in FIG. 1, the operation voltage that causes the pixel unit to work is 8.2V and the response time of the pixel unit is 28.2 ms.

TABLE 1

Properties of pixel unit when the sum of strip width plus interval between common electrode strips is 5 μm

| | Angle between common electrode strips and pixel electrode strips (degrees) | | | |
| --- | --- | --- | --- | --- |
| | 15 | 30 | 45 | 90 |
| Strip width of common electrode (μm)/Interval of common electrode strips (μm) | 2.5/2.5 | 2.5/2.5 | 2.5/2.5 | 2.5/2.5 |
| Reduction in storage capacitance (%) | 22.2 | 22.0 | 22.4 | 21.0 |
| Operation voltage (V) | 8.4 | 8.4 | 8.4 | 8.8 |
| Response time (s) | 28.9 | 28.9 | 28.7 | 27.8 |

TABLE 2

Properties of pixel unit when the sum of strip width
plus interval between common electrode strips is 6 μm

| | Angle between common electrode strips and pixel electrode strips (degrees) | | | |
|---|---|---|---|---|
| | 15 | 30 | 45 | 90 |
| Strip width of common electrode (μm)/Interval of common electrode strips (μm) | 3.5/2.5 | 3.5/2.5 | 3.5/2.5 | 3.5/2.5 |
| Reduction in storage capacitance (%) | 32.1 | 32.7 | 33.2 | 31.5 |
| Operation voltage (V) | 9.2 | 9.2 | 9.2 | 9.6 |
| Response time (s) | 29.6 | 29.0 | 29.0 | 28.4 |

TABLE 3

Properties of pixel unit when the sum of strip width
plus interval between common electrode strips is 7 μm

| | Angle between common electrode strips and pixel electrode strips (degrees) | | | |
|---|---|---|---|---|
| | 15 | 30 | 45 | 90 |
| Strip width of common electrode (μm)/Interval of common electrode strips (μm) | 4.5/2.5 | 4.5/2.5 | 4.5/2.5 | 4.5/2.5 |
| Reduction in storage capacitance (%) | 40.0 | 40.4 | 40.4 | 42.3 |
| Operation voltage (V) | 10.0 | 10.4 | 10.2 | 10.6 |
| Response time (s) | 31.2 | 31.2 | 31.5 | 30.3 |

As can be seen from the above tables, the common electrode in a pixel unit is in the form of common electrode strips, and a certain angle be formed between the common electrode strips and the pixel electrode strips, the storage capacitance of the pixel unit can be reduced considerably; while the reduced value of the storage capacitance has a close relationship with the value of the sum of a strip width and an interval between the common electrode strips, and has a relatively small relationship with the above-mentioned angle. Furthermore, as compared to the existing pixel unit, for pixel units in the tables, the operation voltage and the response time each have no obvious change, and this shows that the structure according to the embodiment brings no disadvantageous effect on other main properties of the pixel units.

It should be noted that the above mentioned values of the width and interval of the electrode strips are optional and not of limitation to the protection scope of the invention. For example, the width and the interval of pixel electrode strips are not limited to 2.6 μm and 5.4 μm respectively and can be modified as desired. Similarly, the width of common electrode strips is not limited to the values of 2.5 μm, 3.5 μm and 4.5 μm list in the aforesaid tables; and the interval between common electrode strips is not limited to 2.5 μm. For example, if there is a specific requirement on the electric field to be formed, the interval between common electrode strips can be set to be any value in a range of 0~4 μm or even in a narrower range. Also, the sum of the strip width and the interval between adjacent common electrode strips is not to the values of 5 μm, 6 μm and 7 μm list above. These adjustment and modification for the embodiment of the invention do not influence resolving of the technical problem and still can obtain the desired technical effect.

Embodiment 3

This embodiment provides a pixel unit of an array substrate, which has a structure similar to that of the pixel unit according to Embodiment 2.

The difference between this embodiment and embodiment 2 lies in that, in the pixel unit according to the present embodiment, the relative position of a common electrode with respect to a pixel electrode is opposite to that to the pixel unit according to embodiment 2. That is, in the pixel unit according to the present embodiment, the pixel electrode is located on an array substrate and is an example of the first electrode, with an insulating layer formed thereon (for example, the insulating layer covering the pixel electrode); the common electrode is disposed on the insulating layer and is an example of the second electrode. That is, in this case, the pixel electrode is the first electrode, while the common electrode is the second electrode, both being disposed on the same array substrate.

Each of the common electrode and the pixel electrode in the embodiment comprises common electrode strips, and therefore, whichever between the two electrodes is located on the insulating layer and whichever is located under the insulating layer have no effect on the distribution of electric fields in the pixel unit actually. So, the position of the two electrodes is interchangeable.

Embodiment 4

This embodiment provides an array substrate, comprising a plurality of pixel units which, for example, are arranged in a matrix form, and each of the pixel units, for example, adopts the structure of the pixel unit according to any of the above embodiments.

As the array substrate according to the embodiment employs the above pixel unit, its storage capacitance is relatively low and stable, and the requirement on production precision is not high.

Certainly, in the array substrate according to the embodiment, a gate line and a data line for driving pixel units on the array substrate, driving circuits connected to the gate line and the data line, and so on may also further included. Further, the array substrate may include an alignment layer and other structures. These structures can be implemented in a way which is known or will be developed in the future, and the invention is not limited thereto.

Embodiment 5

This embodiment provides a liquid crystal display device, comprising the array substrate according to the above Embodiment 4.

Figure 7:
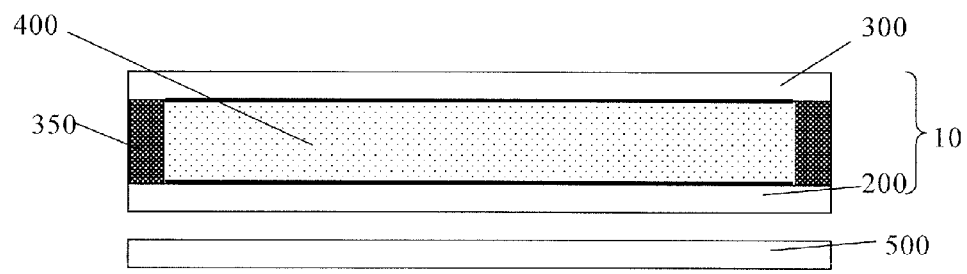
FIG. 7 is a schematically cross-sectional view showing a liquid crystal display device provided by an embodiment of the invention.

As shown in FIG. 7, the display device 10 comprises a counter substrate 300 and an array substrate 200 according to any of the above embodiments which are provided by cell-assembling. The counter substrate 300 includes a black matrix corresponding to pixel units of the array substrate 200. The array substrate 200 and the counter substrate 300 are disposed opposite each other so as to form a liquid crystal cell, and the liquid crystal cell with a liquid crystal material 400 filled therein is sealed by sealant 350. The counter substrate 300 is for example a color filter substrate, and the black matrix on the color filter substrate defines pixel units corresponding to the pixel units on the array substrate 200, and in each of the pixel units of the color filter substrate, there is formed a color filter such as one of RGB filter.

In some examples, the liquid crystal display device 10 may further include a backlight source 500 for providing backlight for display, for example, which is located below the array substrate 300.

As the liquid crystal display device according to the embodiment employs any one of the above-mentioned pixel units, storage capacitance is relatively low and stable, and the requirement on production precision is not high.

For example, the liquid crystal display device may be embodied as a liquid crystal panel, an electronic paper, a cell phone, a tablet computer, a television, a display, a notebook computer, a digital photo frame, a navigator, or any product or component having a display function.

It can be understood that, the foregoing embodiments are merely exemplary embodiments which are used to explain the principle of the invention, but the invention is not limited thereto. For those ordinarily skilled in the art, various variances and improvements can be made by them without departing from the spirit and essence of the invention, and these variances and improvements should also been deemed within the protection scope of the invention.

The invention claimed is:

1. A pixel unit, comprising: a first electrode, an insulating layer located on the first electrode, and a second electrode located on the insulating layer;
    wherein the first electrode includes a plurality of first electrode strips which are parallel to each other and are spaced at an interval, the second electrode includes a plurality of second electrode strips which are parallel to each other and are spaced at an interval, and
    an angle between an extension direction of the first electrode strips and an extension direction of the second electrode strips located above the first electrode strips is larger than 0 degree and smaller than or equal to 90 degrees;
    wherein among the first electrode strips, a sum of a width of one first electrode strip and an interval of the one first electrode to an adjacent first electrode strip ranges between 5 μm and 7 μm;
    wherein among the second electrode strips, a sum of a width of one second electrode strip and an interval of the one second electrode to an adjacent second electrode strip ranges between 5 μm and 10 μm;
    wherein widths of the first electrode strips that are parallel to each other are gradually increased; and
    wherein widths of the second electrode strips that are parallel to each other are gradually increased.

2. The pixel unit claimed as claim 1, wherein the angle between the extension direction of the first electrode strips and the extension direction of the second electrode strips located above the first electrode strips is larger than 10 degrees and smaller than or equal to 90 degrees.

3. The pixel unit claimed as claim 1, wherein the first electrode is a common electrode, and the second electrode is a pixel electrode.

4. The pixel unit claimed as claim 3, wherein intervals between adjacent first electrode strips among the first electrode strips are equal.

5. The pixel unit claimed as claim 1, wherein the first electrode is a pixel electrode, and the second electrode is a common electrode.

6. The pixel unit claimed as claim 5, wherein widths of all the second electrode strips are equal.

7. The pixel unit claimed as claim 5, wherein intervals between adjacent second electrode strips among the second electrode strips are equal.

8. The pixel unit claimed as claim 6, wherein intervals between adjacent second electrode strips among the second electrode strips are equal.

9. An array substrate, comprising the pixel unit claimed as claim 1.

10. A liquid crystal display device, comprising the array substrate claimed as claim 9.

* * * * *